April 14, 1953 A. J. LEWUS 2,635,160
AIR CONTROLLED SWITCH
Filed Oct. 7, 1949 2 SHEETS—SHEET 1
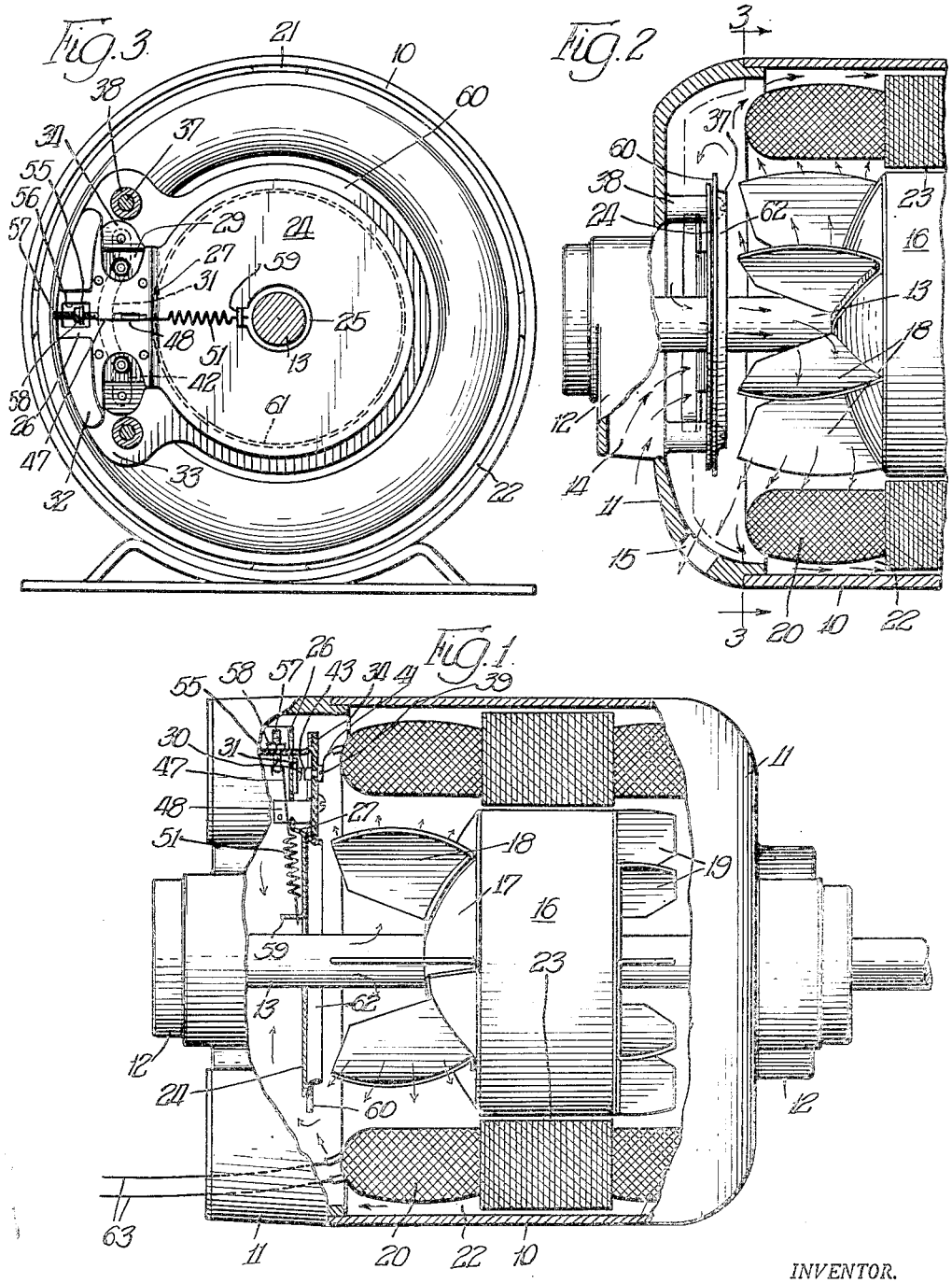
INVENTOR.
Alexander J. Lewus,
BY
ATTY

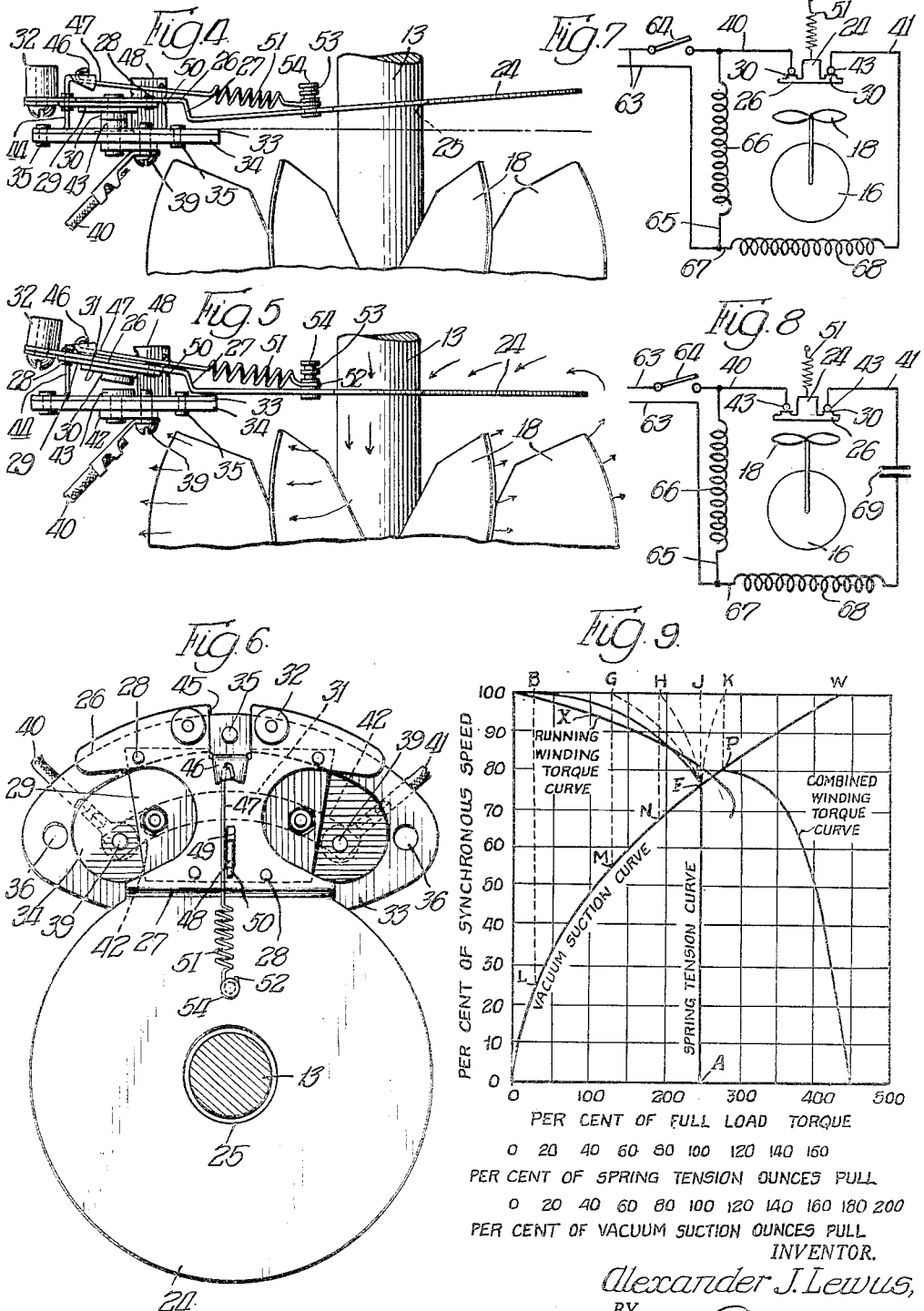

Patented Apr. 14, 1953

2,635,160

UNITED STATES PATENT OFFICE 2,635,160

AIR CONTROLLED SWITCH

Alexander J. Lewus, Cicero, Ill.

Application October 7, 1949, Serial No. 120,015

3 Claims. (Cl. 200—153)

The present invention relates to split phase or capacitor type motors and has for its object the provision of a switch for a starting winding operable by air current or vortex engendered within the motor casing.

A still further object of the present invention is the utilization of rotation of the rotor for creating air current or vortex within the motor for actuating a switch for disconnecting starting winding from the stator in order that the operation of the motor may be taken up by the running winding when the load in the latter has reached sufficient intensity.

Another object of the present invention is the provision within a motor casing of a movable switch plate, normally maintaining the starting winding line closed, with means for shifting the switch plate for disconnecting the starting winding from the circuit when the load in the running winding has reached a sufficient degree of intensity in order that the latter winding may continue to operate the motor.

Another object of the present invention is the provision of a fan in connection with a rotor for creating air current or vortex within the motor casing for the purpose of actuating a switch plate of the character indicated in order to disconnect the starting winding from the circuit when the load in the running winding has reached a sufficient degree of intensity to continue the operation of a motor.

In motors having switches for disconnecting the starting winding from the circuit such switches are usually operable by mechanical means which not only wear out, but also during their operation often become inefficient due to friction, and often rattle and create noises as the friction increases due to wearing out of the parts. Therefore, another object of the present invention is to engender air current in a motor casing and utilizing the same for actuation of a switch of the type indicated, and to thereby eliminate mechanical parts for actuating the switch.

Another object of the present invention is the provision of a means for a switch of the character indicated for regulating the degree of responsiveness in the switch in order that the operation of the switch may be either timed with the inception of the operation of the running winding instantly when the load in the latter has reached the full capacity, or that the same may connect the starting winding into the circuit within any reasonable predetermined interval of time after the motor has been disconnected from the single phase line.

With the above general objects in view and others that will appear as the invention is better understood, the same consists in the novel construction, combination and arrangement of parts hereinafter more fully described, illustrated in the accompanying drawing and pointed out in the appended claims.

In the drawings forming a part of this application, and in which like designating characters refer to corresponding parts throughout the several views:

Fig. 1 is a side elevational view of a completely closed motor casing, partly broken away, with the longitudinal cross-section of a stator, and a rotor in elevation, illustrating the present device in cross-section while the same is in an operative position;

Fig. 2 is a longitudinal cross-sectional view of a motor casing provided with air openings, with the longitudinal cross-section of a stator, and a rotor in elevation, illustrating the present device in elevation while in an operative position, the view of the present device being substantially at 90 degrees from the position thereof in Fig. 1;

Fig. 3 is an elevational view of the contents of a motor casing, showing in elevation one face of the present device, the view having been taken substantially on line 3—3 of Fig. 2;

Fig. 4 is an enlarged side elevational view of the present device of a slightly modified construction while in an inoperative position;

Fig. 5 is a similar view of the device while in an operative position;

Fig. 6 is an enlarged face elevational view of the present device;

Fig. 7 is a diagrammatic view of the circuit of a split phase motor with the present device in an inoperative position;

Fig. 8 is a diagrammatic view of the circuit of a capacitor motor with the present device in an inoperative position; and Fig. 9 is a graphical table illustrating the performance of the present device.

Referring to the present drawings in detail there is shown motor casing 10 having at its both ends end plates 11. The latter are provided with central bearings 12 through which shaft 13 is extended and within which the same is supported for a rotary movement. End plates 11 in Fig. 1 are sealed rendering the motor casing assembly completely closed, while one of the end plates 11 in Figs. 2 and 3 is provided with air inlet vent 14 and air exhaust vent 15.

Shaft 13 is extended through rotor 16 with which the same is in a rigid association. One end of said rotor 16 is of a semi-spherical formation as at 17 and is there provided with a fan consisting of a plurality of radially extending blades 18. The opposite end of rotor 16 is on a straight plane and is there provided with a fan including a plurality of shorter blades 19.

Stator 20, which includes starting and running windings, is supported within casing 10 by means of a plurality of strips 21, which are interposed between said casing 10 and stator 20 for frictionally engaging said stator 20 and for maintaining the same in a rigid position within casing 10. Otherwise said stator 20 is spaced away from casing 10 for defining air passages 22. Rotor 16 is spaced from stator 20, defining air passage 23. Said air passages 22 and 23 permit air currents to pass from one end of the motor casing to the other.

Referring more particularly to Figs. 4, 5 and 6, the switch constituting the subject matter of this invention includes movable plate 24 which is round, and is provided with a central round opening 25, through which shaft 13 extends. Said plate 24 is integrally formed with contact carrying plate 26. The two plates are connected by an integrally formed strip 27, by virtue of which said contact carrying plate 26 is off-set from the plane of said plate 24.

Affixed by means of a plurality of rivets 28, to the underface of said contact carrying plate 26, is insulating plate 29, to which a pair of contacts 30 is affixed. Said contacts 30 are in a mutually spaced relation, and along the inner face of said insulating plate 29, said contacts are connected by means of metallic jumper 31.

Affixed to said contact carrying plate 26, at the outer free end thereof, and on the outer face thereof, is a plurality of counterweights 32, the combined weight of which together with the weight of said contact carrying plate 26 substantially equal the weight of said movable plate 24.

Co-acting with said movable plate 24 and contact carrying plate 26 is a stationary supporting plate 33, which is in effect an oval-shaped strip superimposed upon insulating plate 34, both connected by a plurality of rivets 35. Said base plate 33 and insulating plate 34 will hereinafter be referred to as base plate 33.

Said base plate 33 at each of its ends is provided with screw opening 36 for accommodating therewithin screw 37, which, passing through spacing collar 38, engages end plate 11 and rigidly affixes said base plate 33 thereto.

Insulating plate 34 is provided with a pair of terminals 39, to which a pair of wires 40 and 41 connect. Said terminals 39, by means of connecting plates 42 connect with contacts 43 disposed at the opposite face of said insulating plate 34, and in an alinement with contacts 30.

Integrally formed with said base plate 33, and upwardly projecting from the inner edge thereof, is an upright post 44, which is accommodated within recess 45 made in contact carrying plate 26. At its upper end said post 44 has horizontal extension 46, provided with an opening therein through which the hooked end of spring wire 47 is passed and engaged with said extension 46.

Integrally formed with base plate 33 and upwardly projecting therefrom is arm 48 passing through slot 49 made in the insulating plate 29 and contact carrying plate 26. On one edge said arm is provided with notch 50, within which the body portion of said contact carrying plate 26, adjacent strip 27, is receivable.

Said spring wire 47, adjacent its opposite end, is formed into coil spring 51, and terminates in hook 52, selectively receivable within one of circumferential grooves 53 made in pin 54 which is riveted to movable plate 24.

From the hereinabove description it will be apparent that the body portion of contact carrying plate 26, adjacent said slot 49, which enters said notch 50, in conjunction with arm 48, against which it bears due to the action of coil spring 51, forms a fulcrum upon which movable plate 24 and contact carrying plate 26 angularly shift for the purpose of bringing the two plates into their inoperative position shown in Fig. 4, or to the operative position illustrated in Fig. 5. When hook 52 is engaged at the innermost groove 53, as seen in Figs. 4 and 5, spring 51 exerts the minimum degree of tension, thereby requiring the minimum force exerted at movable plate 24 to bring the same from its inoperative position shown in Fig. 4 to its operative position shown in Fig. 5.

Conversely, when said hook 52 is engaged at the outermost groove 53, the tension of spring 51 will thereby be increased, requiring a maximum degree of force to bear against plate 24 to shift the same from its inoperative to operative positions. The variability of the tension of spring 51 in the two instances is based upon the fact that when plate 24 is in its inoperative position, shown in Fig. 4, the upper end of pin 54 is nearer to extension 46 than the lower end thereof. For this reason, when hook 52 is engaged at one of the outermost grooves 53, spring 51 exerts the least tension upon pin 54. Thus, it will be apparent that the degree of tension of spring 51 is capable of regulation and adjustment depending upon the degree of air pressure upon plate 24, circulated within the motor casing 10, as will be hereinafter apparent, necessary to overcome the tension of spring 51 in order to shift movable plate 24 from its inoperative position to its operative position as aforesaid.

The switch shown in Figs. 1 to 3 in its main embodiments is essentially of a construction similar to that included in the form of the switch illustrated in Figs. 4 to 6, inclusive. The switch shown in Figs. 1 to 3, inclusive, includes arm 55, integrally formed with and upwardly projecting from base plate 33. Said arm passes through opening 56 made in the contact carrying plate 26, and extends above the plane of said latter plate. Threaded bolt 57 is threadedly engaged with said arm 55 in a transverse relation, and is engaged at one of its ends by spring wire 47. Passed over the opposite end of said bolt 57 is lock nut 58 for maintaining bolt 57 in its adjusted position. The opposite end of spring wire 47 has coil spring 51 formed therein, and thereupon is attached to tongue 59, which is integrally formed with movable plate 24, adjacent opening 25, and in a right-angled relation with the body of said movable plate 24.

In the modified construction of the switch shown in Figs. 1 to 3, inclusive, base plate 33 has an integrally formed supporting plate 60, provided with a central opening 61 of a diameter slightly less than the diameter of movable plate 24. Said opening is defined by flange 62 extending from one side of said supporting plate 60. When movable plate 24 has shifted to its operative position, shown in Fig. 1, the same rests upon and contacts with said supporting plate 60. In the form of switch, illustrated in Figs. 4 to 6, inclusive, the body portion of movable plate 24 adjacent strip 27 bears against the adjacent rim portion of base plate 33 when said movable plate 24 has shifted to its operative position, shown in Fig. 5, and thus said rim portion of plate 33 constitutes the means for limiting farther shifting movement of said movable plate 24.

When rotor 16 and shaft 13 rotate the fan blades 18 and 19 will simultaneously rotate. In the form of the casing illustrated in Fig. 1, in which the casing is completely sealed, fan blades 18 will create a vortex, with a vacuum engendered in the proximity of the core of the fan, which is shaft 13. The vacuum thus engendered acts as a suction upon movable plate 24 to draw said plate in contact with the supporting plate 60. Air currents and vacuum engendered by fan blades 18 are forced to pass through space 23 to the opposite end of the motor casing. There, the rotating blades 19 force the air currents laterally and to the space between motor casing 10 and stator 20, to in turn pass to the opposite face of movable plate 24, which latter currents in conjunction with the suction from the opposite side of plate 24 tend to maintain the latter in its operative position, and against the tension of spring 51, as is seen in Fig. 1.

A similar action takes place in the modified construction of casing, shown in Fig. 2. There the fan blades 18 create a suction at the inner face of movable plate 24, which tends to draw the air through opening 14 and throw it against the opposite face of said movable plate 24. Air circulates within the casing and is ultimately expelled through exhaust vent 15. In each form of the casing substantially the same air action upon movable plate 24 takes place, namely, from the inner face of plate 24 a vacuum and a consequent suction upon plate 24 is created, with the resultant increased air pressure at the opposite face of plate 24 for the purpose of shifting said plate 24 into its operative position and for maintaining said plate in its operative position as long as rotor 16 with fans 18 and 19 rotates. It should be added however, that in addition to acting upon plate 24 for the purposes hereinabove specified the circulating air also acts as a cooling means upon the motor.

Referring more particularly to the digrammatic showing of the circuits in Figs. 7 and 8, there is shown a pair of electric wires 63 leading to any electric source. Said wires 63 connect with stator 20, as is shown in Fig. 1. One of said wires 63 connects with switch 64. Wires 63, within stator 20, are connected by line 65 upon which running winding 66 is located. From the point of connection between said line 65 and one of said wires 63, wire 40 leads to one of the said stationary contacts 43, through terminal 39 and connecting plate 42. The other of said wires 63 pass the contact point therebetween and said line 65 has a continuation line 67 upon which starting winding 68 is located. Wire 41 leaving the opposite end of said starting winding 68 connects by its opposite end with the other of said stationary contacts 43 carried by said stationary plate 33.

The circuits traced in Figs. 7 and 8 are identical, except that the circuit in Fig. 8, representing the circuit in a capacitor motor, includes condenser 69 which is located within wire 41.

Referring now to the operation of the switch, which constitutes the subject matter of the present invention, when switch 64 is open, rotor 16 is at rest, with movable plate 24 in an inoperative position due to the action of coil spring 51. In that latter position the two pairs of contacts 30 and 43 are in contact with each other, as is shown in Figs. 4, 7 and 8. When switch 64 is closed electrical current will be completed through wires 63 for energizing starting winding 68 for starting the operation of the motor by imparting rotary movement to rotor 16, and fans 18 and 19. The operation of said fans 18 and 19 create air turbulence in the motor casing for shifting movable plate 24 to its operative position shown in Figs. 1 and 5, as was hereinabove described. The shifting of said movable plate 24 to its operative position instantly disconnects contacts 30 from contacts 43, thereby breaking the connection in wires 40 and 41, and rendering starting winding 68 inoperative. By the time when said contacts 30 and 43 become disconnected sufficient load has been engendered in the running winding 66 for continuing the operation of the motor. When switch 64 is disconnected rotor 16 does not immediately stop but continues to rotate due to the centrifugal force, gradually decelerating until it comes to rest. When the rotor fans 18 and 19 come to a rest, movable plate 24, due to the action of spring 51 is instantly shifted to its inoperative position with contacts 30 and 43 in contact, as is seen in Fig. 4.

When said contacts 30 and 43 are in contact, wires 40 and 41 are connected through terminals 39, connecting plates 42 and jumper 31, thereby completing the circuit for inducing the operation of starting winding 68 when switch 64 is closed.

It should also be noted that opening 25 is of a diameter somewhat larger than the diameter of shaft 13, thereby permitting the angular shifting movement of movable plate 24 without interference from shaft 13.

From the hereinabove description it will be apparent that the switch herein disclosed requires a relatively low air velocity for actuating the same and for recirculating the air in the motor casing. To control the switch automatically only a negligible amount of power consumption loss of the input of a motor is brought about.

It is also noted that there is a definite correlation between the degree of tension in spring 51 and the degree of the air pressure on movable plate 24 to overcome the tension of said spring 51. The tension of spring 51 to adapt the same to the most efficient operation relatively to the air pressure upon movable plate 24 may be regulated by connecting hook 52 with any one of the circumferential grooves 53 of pin 54, in the form of the switch illustrated in Figs. 4, 5 and 6, or by shifting bolt 57 into one or the opposite direction in the form of the switch shown in Figs. 1, 2 and 3.

Referring now more particularly to the table in Fig. 9, the same graphically illustrates the actual performance of a capacitor motor diagrammatically shown in Fig. 8. When switch 64 is closed, at the inception of the starting of the motor the tension of spring 51 on the movable plate 24 is nearly constant as shown in Fig. 9 by the spring tension curve from points A to F, while the vacuum suction curve is being increased, with rotor speed to point F.

While rotor 16 is gaining in speed, which gain is shown by curve F to W, the vacuum suction is increasing, with the tension of spring 51 upon plate 24 rapidly decreasing, as shown by curve from points F to B. The decrease of the tension of spring 51 upon movable plate 24, when the same has shifted to the operative position, shown in Fig. 5, is accounted by the fact that said spring 51 has approached almost a horizontal position coextensive with the plane of said movable plate 24. Thus, the tension of said spring 51 has largely transferred itself to the fulcrum defined by notch 50 rather than upon plate 24 itself as obtains while said plate is in an inoperative position, shown in Fig. 4.

At point F the starting winding circuit is opened and the running winding commences to operate the motor to full load speed at point X and no load near synchronous speed. However, when the motor is disconnected from the single phase supply line on opening switch 64, rotor 16 is decelerating gradually to a stop, with the tension of spring 51 on movable plate 24 at a minimum, as indicated by point B. While the minimum tension of spring 51 on movable plate 24 is maintained, as indicated by line BL, the vacuum suction curve decreases to point L, and from point L to the motor standstill position the vacuum suction upon plate 24 diminishes, conditioning the tension of spring 51 to shift movable plate 24 to its inoperative position.

The delayed action of spring 51 upon movable plate 24 for bringing the same to its inoperative position, in a capacitor motor when the same is disconnected from the single phase line, is desirable, because it eliminates the audible magnetic disturbance created by the condenser discharge voltage in the starting winding circuit, especially when the starting winding circuit is rapidly completed while the rotor is decelerating to a stop.

Lines and curves G to M, H to N, J to F, K to F and K to P represent various degrees of tension of spring 51 upon movable plate 24, by means of pin 54 or bolt 57, with relation to the degree of the vacuum suction upon plate 24, as represented by the vacuum suction curve W to O. The adjustability of tension of spring 51 with relation to the degree of the vacuum suction upon plate 24 adapts said spring 51 to various motors and various conditions.

Although blades 18, as shown, are straight, it is understood that fan blades may be of various shapes and constructions. Also, the switch assembly, if desired can be outside of the motor assembly, in connection with which various centrifugal blowers or fans may be employed. While the switch disclosed herein is of an open type in a motor casing, it is to be understood however that the same may be totally enclosed, with contacts shielded so as to prevent the deposit upon the contacts of any solid matter.

While there is described herein a preferred embodiment of the present invention, it is nevertheless to be understood that minor changes may be made therein without departing from the spirit and scope of the invention as claimed.

What I claim as new is:

1. A switch of the type described comprising a stationary plate, a movable plate, contacts carried by said plates in position for coaction with each other upon relative movement of the plates together, a lug carried by the stationary plate and extending through the movable plate and supporting the movable plate for swinging movement relative thereto, a pin fixed on the movable plate, anchoring means fixed to the stationary plate on the opposite side of the lug from the pin, the contact on the movable plate being on the same side of the lug as the anchoring means and on the opposite side of said lug from the pin, and a tension spring anchored at one end to the anchoring means and at the opposite end to the pin normally tending to maintain the contacts in engagement with each other.

2. A switch of the type described comprising a stationary plate, a movable plate having a portion thereof offset from the remainder of said plate, opposed coacting contacts carried by said offset portion and by the stationary plate in position for engagement upon movement of said offset portion toward the stationary plate, a lug fixed to the stationary plate and extending through the offset portion of the movable plate and pivotally supporting said movable plate thereon, a pin fixed to the movable plate, a post fixed to the stationary plate on the opposite side of the lug from the pin, and a tension spring anchored at one end to the post and at the opposite end to the pin normally tending to maintain the contacts in engagement with each other.

3. A switch of the type described comprising a stationary plate, a movable plate having a portion thereof offset from the remainder of said plate, opposed coacting contacts carried by said offset portion and by the stationary plate in position for engagement upon movement of said offset portion toward the stationary plate, a lug fixed to the stationary plate and extending through the offset portion of the movable plate and pivotally supporting said movable plate thereon, a pin fixed to the movable plate, a post fixed to the stationary plate on the opposite side of the lug from the pin, and a tension spring anchored at one end to the post and at the opposite end to the pin normally tending to maintain the contacts in engagement with each other, said pin having a plurality of grooves therein for adjustment of the spring relative thereto to vary the tension on the movable plate.

ALEXANDER J. LEWUS.

References Cited in the file of this patent

UNITED STATES PATENTS

| Number | Name | Date |
|---|---|---|
| 690,515 | Comstock | Jan. 7, 1902 |
| 1,720,294 | Sanders | July 9, 1929 |
| 1,789,608 | Thomas | Jan. 20, 1931 |
| 1,834,217 | Lipman | Dec. 1, 1931 |
| 1,946,165 | Irwin | Feb. 6, 1934 |
| 2,080,817 | Guinosso | May 18, 1937 |
| 2,121,651 | Claytor | June 21, 1938 |
| 2,312,241 | Drachenberg | Feb. 23, 1943 |
| 2,425,178 | Ellerbeck | Aug. 5, 1947 |
| 2,480,566 | French | Aug. 30, 1949 |
| 2,488,459 | Weber et al. | Nov. 15, 1949 |
| 2,503,581 | French | Apr. 11, 1950 |
| 2,566,534 | Reger | Sept. 4, 1951 |

FOREIGN PATENTS

| Number | Country | Date |
|---|---|---|
| 592,219 | Germany | Feb. 3, 1934 |